(12) United States Patent
Kim et al.

(10) Patent No.: US 9,612,444 B2
(45) Date of Patent: Apr. 4, 2017

(54) DISPLAY APPARATUS AND CONTROL METHOD THEREOF

(71) Applicant: SAMSUNG ELECTRONICS CO., LTD., Suwon-si (KR)

(72) Inventors: Dae-sik Kim, Hwaseong-si (KR); Sergey Shestak, Suwon-si (KR); Seong-woo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 14/499,535

(22) Filed: Sep. 29, 2014

(65) Prior Publication Data

US 2015/0145969 A1 May 28, 2015

(30) Foreign Application Priority Data

Nov. 26, 2013 (KR) .......................... 10-2013-0144797

(51) Int. Cl.
*G02B 27/22* (2006.01)
*H04N 13/04* (2006.01)
*G02B 3/00* (2006.01)

(52) U.S. Cl.
CPC ....... *G02B 27/2214* (2013.01); *G02B 3/0068* (2013.01); *G02B 27/2292* (2013.01); *H04N 13/0404* (2013.01); *H04N 2213/001* (2013.01)

(58) Field of Classification Search
CPC ............ G02B 27/2214; G02B 27/2292; G02B 3/0068; H04N 13/0404; H04N 2213/001
USPC ....... 348/14.07, 14.08, 51, 59, 739; 345/1.1, 345/4–6, 204, 419; 359/462, 463, 455; 349/15
See application file for complete search history.

(56) References Cited

U.S. PATENT DOCUMENTS

| | | | |
|---|---|---|---|
| 8,195,243 B2* | 6/2012 | Kim | G06F 1/1616 345/156 |
| 8,624,797 B2 | 1/2014 | Lee et al. | |
| 2003/0169332 A1* | 9/2003 | Ebina | G02B 3/0056 348/52 |
| 2006/0181607 A1* | 8/2006 | McNelley | G02B 27/2292 348/14.08 |
| 2007/0008617 A1* | 1/2007 | Shestak | G02B 27/2214 359/455 |

(Continued)

FOREIGN PATENT DOCUMENTS

| | | |
|---|---|---|
| KR | 10-2011-0038980 A | 4/2011 |
| KR | 10-2011-0111605 A | 10/2011 |

(Continued)

*Primary Examiner* — Thai Tran
*Assistant Examiner* — Stephen Smith
(74) *Attorney, Agent, or Firm* — Sughrue Mion, PLLC (57) ABSTRACT

A display apparatus includes a main panel which displays video, a sub panel which projects and provides the video displayed on the main panel by including a first lens array and a second lens array facing the first lens array so as to share a focus with the first lens array, a hinge which connects the sub panel and the main panel in a manner in which the sub panel is displaceable from the main panel according to user manipulation, a sensor which senses angles formed by the main panel and the sub panel, and a controller which controls so that the video is adjusted based on the sensed angles and displayed on the main panel.

18 Claims, 11 Drawing Sheets

(56) References Cited

U.S. PATENT DOCUMENTS

| | | | | | |
|---|---|---|---|---|---|
| 2008/0007827 | A1* | 1/2008 | Kinoshita | ............... | G03B 21/10 359/446 |
| 2009/0225154 | A1* | 9/2009 | Raymond | .......... | H04N 13/0404 348/51 |
| 2010/0073768 | A1* | 3/2010 | Kim | .................. | G02B 27/2214 359/463 |
| 2011/0084893 | A1* | 4/2011 | Lee | ...................... | G06F 1/1649 345/6 |
| 2011/0216045 | A1* | 9/2011 | Tsuchida | ............... | G06F 1/1616 345/204 |
| 2012/0105306 | A1* | 5/2012 | Fleck | .................... | G06F 1/1643 345/1.1 |
| 2012/0200561 | A1* | 8/2012 | Bando | ................ | H04N 13/0404 345/419 |
| 2012/0314017 | A1* | 12/2012 | Gross | ................ | G02B 27/2214 348/14.07 |
| 2013/0069933 | A1* | 3/2013 | Smithwick | ......... | G02B 27/2214 345/419 |
| 2014/0015814 | A1* | 1/2014 | Santana | .............. | A47L 15/4293 345/204 |
| 2015/0002767 | A1* | 1/2015 | Eichenlaub | ........ | H04N 13/0418 349/15 |
| 2016/0011429 | A1* | 1/2016 | Vdovin | ............. | G02F 1/133526 359/462 |

FOREIGN PATENT DOCUMENTS

| | | |
|---|---|---|
| KR | 10-2012-0081651 A | 7/2012 |
| KR | 10-2012-0093601 A | 8/2012 |

* cited by examiner

DISPLAY APPARATUS AND CONTROL METHOD THEREOF

CROSS-REFERENCE TO RELATED APPLICATION

This application claims priority from Korean Patent Application No. 10-2013-0144797, filed on Nov. 26, 2013 in the Korean Intellectual Property Office, the disclosure of which is incorporated herein by reference in its entirety.

BACKGROUND

1. Field

Devices and methods consistent with exemplary embodiments relate to a display apparatus and a control method thereof, more specifically, the display apparatus that can be folded and the display method thereof.

2. Description of the Related Art

Strengthened by the development of the electronic technology, various types of display apparatuses are used in various fields. Specifically, research related to next generation display apparatuses such as transparent display apparatuses is accelerated.

The transparent display apparatus is a device in which transparent features are obtained and a rear wall of the device can be seen therethrough. The related display panel is produced by using nontransparent conductive compounds such as Si and GaAs; however, while various applied fields that relate to the display panel are developed, efforts to develop new types of electronic components have been made. One of these efforts is developing the transparent display apparatus.

The transparent display apparatus provides transparent features by including transparent oxide conductive layers. When the transparent display apparatus is used, a user can view necessary information through the screen of the transparent display apparatus while viewing the rear background provided behind the apparatus. Therefore, the transparent display apparatus can solve dimension and time limitations that the related display apparatuses may exhibit.

The transparent display apparatus can be conveniently used in various environments with various usages. For example, when a display window at a shop is implemented to be a transparent display apparatus, the display window may display advertising when there is a passer-by to intrigue him/her. Further, when a veranda window within a home is implemented to be transparent display apparatus, a user may view various multimedia contents through the veranda window which may have a bigger size than other display apparatuses. Thus, a user satisfaction increases.

Meanwhile, methods using the transparent display in a user terminal apparatus such as cellular phone are researched with various perspectives recently. Therefore, a new method is requested to efficiently use the transparent display in a user terminal apparatus.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an exemplary embodiment, a technical objective is to provide a display apparatus configured to provide floating images on a display apparatus that can be folded and a control method thereof.

According to an exemplary embodiment, a display apparatus is provided, which may include a main panel configured to display video, a sub panel configured to project and provide the video displayed on the main panel, by including a first lens array and a second lens array facing the first lens array so as to share a focus with the first lens array, a hinge configured to connect the sub panel with the main panel in a manner in which the sub panel is displaceable from the main panel, a sensor configured to sense angles formed by the main panel and the sub panel, and a controller configured to control so that the video is adjusted based on the sensed angles and displayed on the main panel.

The sub panel may provide floating images related to the video displayed on the main panel which is displaced from the sub panel by a preset distance, at a side of the sub panel opposite to the main panel.

The controller may estimate an area to be projected and viewed through the sub panel among the video displayed on the main panel based on the sensed angles, adjust a display position of the video displayed on the main panel based on the estimated area and display the result.

The sub panel may additionally include a transparent medium arranged between the first lens array and the second lens array.

The sensor may include one of an IR transmitter and an IR receiver arranged on one of the main panel and the sub panel, and the controller may control so that distance between the main panel and the sub panel is sensed based on an operation of the IR transmitter and the IR receiver, the video on the main panel is adjusted based on the sensed distances and displayed.

The sub panel may additionally include a transparent display configured between the first lens array and the second lens array to provide 3D video, and the controller may control the transparent display to be on or off according to modes.

The controller may display the 3D video on the transparent display in response to the transparent display being on.

The controller may estimate an area where the 3D video is viewed to be floating on the transparent display based on the sensed angles, adjust display position of the 3D video based on the estimated area and display the 3D video.

The controller may estimate an area where the video displayed on the main panel is projected and viewed on the transparent display based on the sensed angles, and adjust at least one from among brightness values and color values related to a pixel area corresponding to a displayed object on the projected area among the 3D video.

In one exemplary embodiment, a control method of a display apparatus is provided, which may include displaying video on a main panel, sensing angles formed between the main panel and a sub panel which is configured to project and provide the video being displayed on the main panel, by including, at the sub panel, a first lens array and a second lens array facing the first lens array so as to share a focus with the first lens array, and adjusting the video based on the sensed angles and displaying a result.

The sub panel may provide the video displayed on the main panel which is displaced by a preset distance from the sub panel to be floated, at a side of the sub panel opposite to the main panel.

The adjusting the video on the main panel may include estimating an area projected and viewed through the sub panel among the video displayed on the main panel based on the sensed angles, adjusting a display position of the video displayed on the main panel based on the estimated area and displaying the result.

The sub panel may additionally include a transparent medium arranged between the first lens array and the second lens array.

The sub panel may additionally include a transparent display configured between the first lens array and the second lens array and configured to display 3D video, and the control method may additionally include controlling the transparent display to be on or off according to modes.

The control method may additionally include displaying 3D video on the transparent display in response to the transparent display being on.

The control method may additionally include estimating an area where the 3D video is floated on the transparent display based on the sensed angles, adjusting a display position of the 3D video based on the estimated area and displaying the 3D video.

The control method may additionally include estimating an area where the video displayed on the main panel is projected and viewed on the transparent display based on the sensed angles, and adjusting at least one from among brightness values and color values related to a pixel area to the displayed object on the projected area among the 3D video.

According to the invention as described above, provided can be additional effects such as displaying floating images, displaying 3D images that can be viewed from both sides, and displaying overlay floating and 3D images.

BRIEF DESCRIPTION OF THE DRAWINGS

The above and/or other aspects of the present inventive concept will be more apparent by describing certain exemplary embodiments with reference to the accompanying drawings, in which.

DETAILED DESCRIPTION OF EXEMPLARY EMBODIMENTS

Certain exemplary embodiments of the present inventive concept will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Referring to the attached drawings, exemplary embodiments will be described in detail below.

Figure 1:
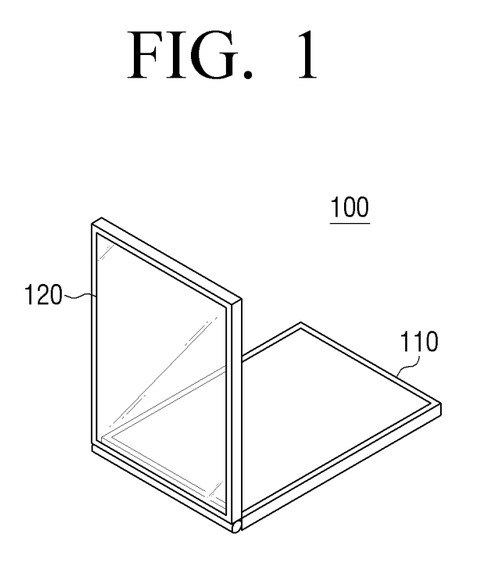
FIG. 1 is a schematic view provided to explain operation of a display apparatus according to an exemplary embodiment.

FIG. 1 is a schematic view provided to explain operation of a display apparatus according to an exemplary embodiment.

As illustrated in FIG. 1, the display apparatus 100 may be implemented to be a user terminal apparatus including a main panel 110 and a sub panel 120. Herein, the user terminal apparatus may be implemented to be various types of devices that can be carried around such as cellular phone, tablet PC, PMP, PDA, or GPS. Meanwhile, when the display apparatus 100 is implemented to be a mobile device, it may include a touch screen so that a user can run programs with a finger or a pen (e.g., stylus pen).

Meanwhile, as illustrated, the main panel 110 and the sub panel 120 may be implemented to be a format that can be folded based on a hinge.

Specifically, the sub panel 120 may be implemented to be transparent, and may provide displayed images on the main panel 110 in various formats according to folding degrees from the main panel 110, or display other 3D images by including a transparent display. The following will specifically explain various exemplary embodiments by referring to the drawings.

Figure 2:
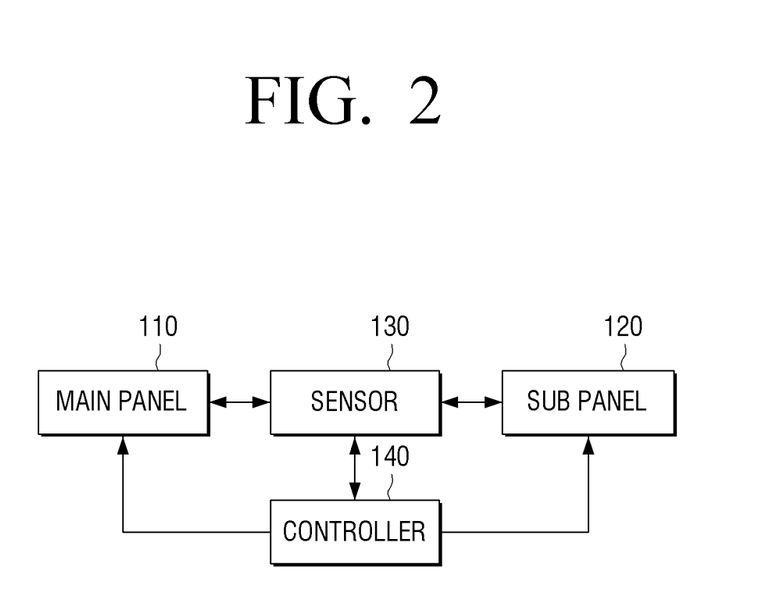
FIG. 2 is a block diagram of a display apparatus according to an exemplary embodiment.

FIG. 2 is a block diagram of the display apparatus according to an exemplary embodiment. Referring to FIG. 2, the display apparatus 100 includes the main panel 110, the sub panel 120, a sensor 130, and a controller 140.

The main panel 110 displays various screens. Herein, screens may include various contents playing screens such as images, video, texts, and music, application implementing screens including various contents, web browser screens, and GUI (graphic user interface) screens. The main panel 110 may be implemented to be LCD (liquid crystal display panel) or OLED (organic light emitting diodes); however, it may not be limited to such. Further, the main panel 110 may be implemented to be a flexible display.

The sub panel 120 may be implemented so that a plurality of lens arrays can be facing each other. For example, the sub panel 120 may include a first lens array and a second lens array facing the first lens array so as to share a focus with the first lens array. Thereby, the sub panel 120 may provide various effects to the video displayed on the main panel 110 in response to the sub panel 120 being displaced from the main display 110 by a preset angle. For example, the sub panel 120 may provide floating images related to the video displayed on the main panel 110 from the opposite direction to a direction which the main panel is positioned. The relevant details will be further explained below by referring to the drawings.

Further, the sub panel 120 may include a transparent medium between the first lens array and the second lens array.

Further, the sub panel 120 may include the transparent display between the first lens array and the second lens array. In this case, the first and the second lens arrays may be implemented to include a lenticular lens sheet which is arranged by columns or rows of the transparent display panel.

Herein, the transparent display may be implemented to be various formats such as a transparent liquid crystal display (LCD) type, a transparent organic light-emitting diode (OLED) type, a transparent thin-film electroluminescent panel (TFEL) type, or a penetrating type.

The transparent LCD type may refer to a transparent display apparatus implemented by removing a backlight unit from LCD device which is currently used, and using a pair of polarized plates, optical films, transparent thin film transistors, and transparent electrodes. The transparent LCD apparatus may provide a lower penetrating degree compared to the polarized plates or the optical films, and lower optical efficiency because surrounding lights are used instead of the backlight unit. However, the transparent LCD apparatus has an advantage that the large-surface transparent display can be implemented. The transparent TFEL type refers to the device using the current type inorganic thin film EL display (AC-TFEL) constituted with transparent electrodes, inorganic fluorescent materials, and insulating layers. AC-TFEL is a display which generates lights by exciting fluorescent materials in response to the accelerated electrons passing through within inorganic fluorescent materials. When the transparent display 130 is implemented to be the transparent TFEL type, the controller 130 may determine information marking position by adjusting so that electrons can be projected on proper positions. Because inorganic fluorescent materials and insulating layers provide transparent features, high quality transparent displays can be implemented.

The transparent OLED type refers to a transparent display apparatus using an OLED that can emit lights. Because organic light emitting layers are transparent, when both electrodes are used as transparent electrodes, the transparent display apparatus may be implemented. OLED emits lights by projecting electrons and holes from both sides of the organic light emitting layers and combining electrons and holes. The transparent OLED apparatus displays information by projecting electrons and holes on proper positions based on the above principle.

Regarding the sub panel 120, the transparent display may turn on/off a display function according to the control of the controller 140, i.e., when the transparent display panels including pixel columns, are further provided between the first lens array and the second lens array.

For example, in response to the display function being turned off, the sub panel 120 may perform a lens function only, and perform a function providing floating images by projecting images provided from the main panel 110.

For another example, in response to the display function being turned on, the sub panel 120 may perform a transparent display function providing 3D images. Thus, the transparent display may provide bi-directional 3D video based on the glass-free 3D principle through the lens arrays provided on both sides. In this case, the depths of lens pitch and lens sheet included in the lens arrays constituting the sub panel 120 may be established to provide 3D images from usual viewing distance of mobile terminal users, i.e., 30~50 cm.

Meanwhile, the main panel 110 and the sub panel 120 connect with each other through the hinge (not illustrated). Herein, the hinge (not illustrated) may connect the two panels so that the sub panel 120 may be displaced into a folded shape from the main panel 110.

The sensor 130 senses angles formed by the main panel 110 and the sub panel 120.

The sensor 130 may measure angular velocity formed with rotation of the sub panel 120 based on the hinge (not illustrated) by sensing movement of the sub panel 120. For the above, the sensor 130 may include a gyro sensor that can sense rotating movement of the sub panel 120. Herein, the gyro sensor is a sensor measuring how much an angle moves per unit time. The gyro sensor may be attached to the sub panel 120; in response to the sub panel 120 rotating, power is applied orthogonally to the velocity vector of the sub panel 120. The gyro sensor may sense angular velocity of the sub panel 120 by using the above power.

Further, the sensor 130 may include an infrared distance sensor provided at least at one of the main panel 110 and the sub panel 120. The sensor 130 may include an IR transmitter and IR receiver, transmit infrared signals through an IR transmitter, receive the infrared signals through an IR receiver, and measure distances between the main panel 110 and the sub panel 120. Specifically, the sensor 130 may calculate distances based on amount of lights or angles in which the transmitted infrared signals via the IR transmitter are received, and calculate angles formed by the main panel 110 and the sub panel 120 based on the distances.

However, this is only one of the exemplary embodiments. The sensor 130 may be implemented to be any format that can sense angles formed by the main panel 110 and the sub panel 120. For example, the sensor 130 may be implemented to include a geomagnetic sensor or an acceleration sensor.

The controller 140 may adjust the video displayed on the main panel 110 based on the sensed angles by the sensor 130.

Specifically, the controller 140 may estimate an area where floating images are provided through the sub panel 120 among the video displayed on the main panel 110 based on the sensed angles, adjust a display position of the video displayed on the main panel 110 based on the estimated area, and display.

For example, when an upper area of the video displayed on the main panel 110 is projected through the sub panel 120 and not viewed from preset folding angle, the controller 140 may adjust and display the position of the video displayed on the main panel 110 so that corresponding area can be projected and viewed on the sub panel 120.

Further, the controller 140 may estimate an area being viewed to be floated from a user among 3D video provided from the sub panel 120 based on the sensed angles, adjust a display position of the displayed video on the sub panel 120 based on the estimated area, and display.

For example, when some video is not viewed from a user among 3D video provided on the sub panel 120 from a preset folding angle, the controller 140 may adjust and display the position of the displayed video on the sub panel 120 so that the video provided on a corresponding area can be viewed from a user.

Specifically, the controller 140 may adjust and display the video by adjusting a resolution of the displayed video or by adjusting its size while keeping its ratio.

Further, when the provided floating images through the main panel 110 and the provided 3D images through the sub panel 120 are provided together, the controller 140 may adjust at least one display position among the displayed images on the main panel 110 and the displayed images on the sub panel 120 so that two images are provided at a proper position.

Further, the controller 140 may reconstitute HTML or perform video-resizing or image-resizing in order to reconstitute the video. Specifically, regarding prestored information such as UI screens, the controller 140 may previously store UI information corresponding to various angles.

Meanwhile, based on the position of user eyesight, video provided to a user may be different among the video provided on the main panel 110 or the sub panel 120.

Thereby, the controller 140 may extract the position of user eyesight, and adjust and provide the video based on the extracted eyesight position and the extracted angles.

Specifically, the controller 140 may estimate an area viewed from a user according to direction of user eyesight and folding angles, adjust and provide the video so that proper video can be displayed on the estimated area. Thereby, the display apparatus 100 may further include an eyesight extractor (not illustrated) which extracts a position and/or direction of user eyesight.

Herein, the eyesight extractor (not illustrated) extracts an area where a user views within the main panel 110 and/or the sub panel 120. At this process, the eyesight extractor (not illustrated) may extract an area where a user views by tracking the direction of a user's face or movement of a user's eyeball.

Specifically, the eyesight extractor (not illustrated) distinguishes eyeball video from the user video photographed by a photographer (not illustrated) through the face modeling technology. Herein, the face modeling technology is an analysis process of processing the face video obtained by the photographer and converting into digital information for transmitting; one of an ASM (active shape modeling) method and an AAM (active appearance modeling) method may be used. Further, the eyesight extractor (not illustrated) may determine movement of the eyeball by using the distinguished eyeball video. The eyesight extractor (not illustrated) may determine area where a user views by extracting direction where a user views with the movement of the eyeball and comparing the coordinate information of the prestored display screen with the direction where a user views.

Meanwhile, the above method determining area where a user views is merely one of the exemplary embodiments; another method may be used to determine the area where a user views. For example, the eyesight extractor (not illustrated) may determine an area where a user views by tracking the direction of a user's face.

Further, the controller 140 may estimate an area to be viewed from a user by additionally using distances between a user, e.g., a user's face, and the display 100 or between a user eyeball and the display 100. Thereby, the display apparatus 100 may further include a distance calculator (not illustrated). The distance calculator (not illustrated) may include a light emitter which emits light toward objects and a light receiver which receives lights reflecting from the objects, and calculate distances from the objects through the light emitter and the light receiver.

Further, when the sub panel 120 is implemented to include the transparent display, the controller 140 may control the transparent display to be on/off according to modes. In response to the display function being on, the transparent display displays video separately from the main panel 110. In response to the display function being off, the first and the second lens arrays being only included, and transparent medium being included, the transparent display may project the video displayed on the main panel 110 and provide floating effects.

Specifically, the controller 140 may control the transparent display to operate in on/off mode according to user manipulation or exterior environment. For example, when the illumination intensity is sensed to be exceeding a preset critical value, the controller 140 may control the transparent display to operate in the off mode. When the illumination intensity is sensed to be less than the preset critical value, the controller 140 may control the transparent display to operate in the on mode.

In this case, the controller 140 expresses each pixel regarding the video display screen by turning on/off the transparent thin film transistor provided in each cell within the transparent display. Further, when display features of the video are modified, the controller 140 may modify display features on corresponding pixels by using a renderer and a scaler. Further, the controller 130 may differently modify pixel coordinate values of the pixels to be displayed in response to displacement of the display position of the video.

Figure 3A:
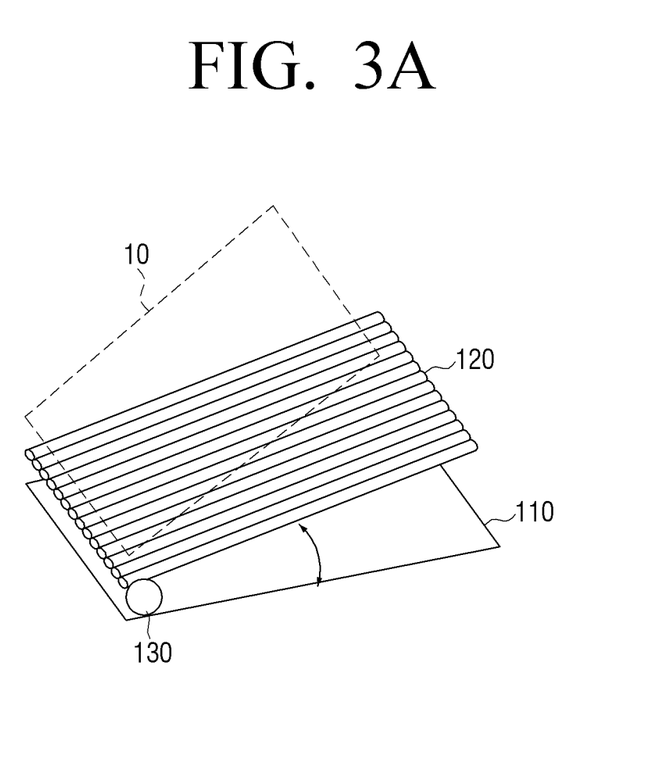
FIGS. 3A and 3B illustrate constitutions of the display apparatus according to an exemplary embodiment.
Figure 3B:
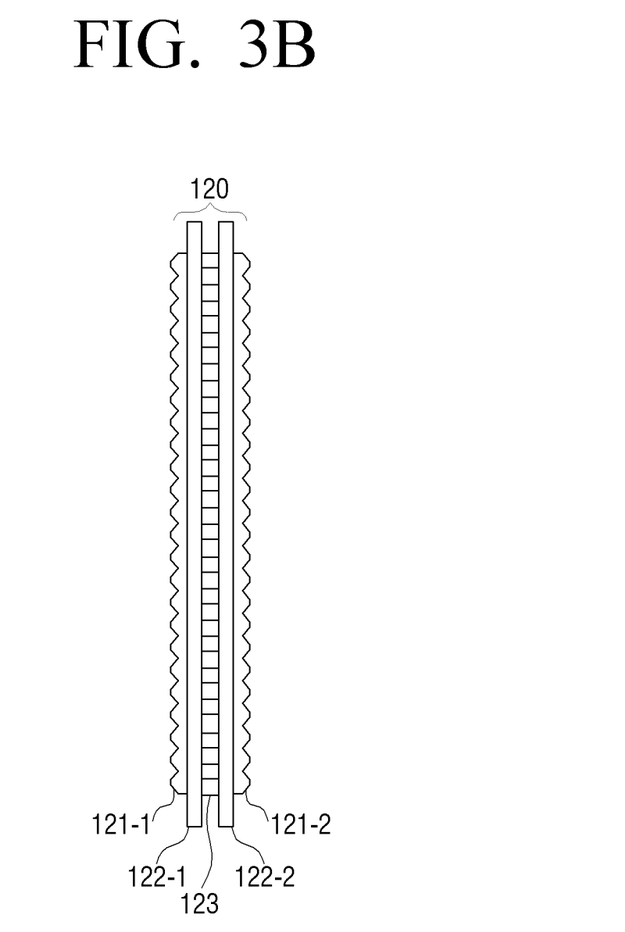

FIGS. 3A and 3B are views provided to explain a constitution of the display apparatus according to an exemplary embodiment.

As illustrated in FIG. 3A, the sub panel 120 may be implemented to be folded from the main panel 110 by a preset angle, and may include lens arrays.

When the main panel 110 and the sub panel 120 form a preset angle, the video displayed on the main panel 110 may be floated and provided at space 10 at a preset distance from the sub panel 120 according to operation of the lens arrays.

Meanwhile, the sub panel 120 may have various positions regarding the main panel 110. Thereby, the sensor 130 may generate information signals indicating the angles by sensing angles between the main panel 110 and the sub panel 120.

FIG. 3B illustrates a constitution of the sub panel 120. The sub panel 120 may be constituted to include pixel layer 123 placed between plates 122-1, 122-2 and project the video displayed on the main panel 110. For example, the lens sheet 121-1, 121-2 constituted with a lenticular lens may be provided on both sides of the sub panel 120. Herein, depths of the lens pitch and the lens sheet may be established to provide multi view 3D images from a usual viewing distance of a user regarding the display apparatus 100, i.e., 30~50 cm. Further, a radius of the lens may be constituted so that two lenticular lens sheets can share a focus. Further, in order to prevent resolution from being reduced, the lenticular lens may be arranged according to pixel columns of the sub panel 120 and tilted by a preset angle.

Figure 4:
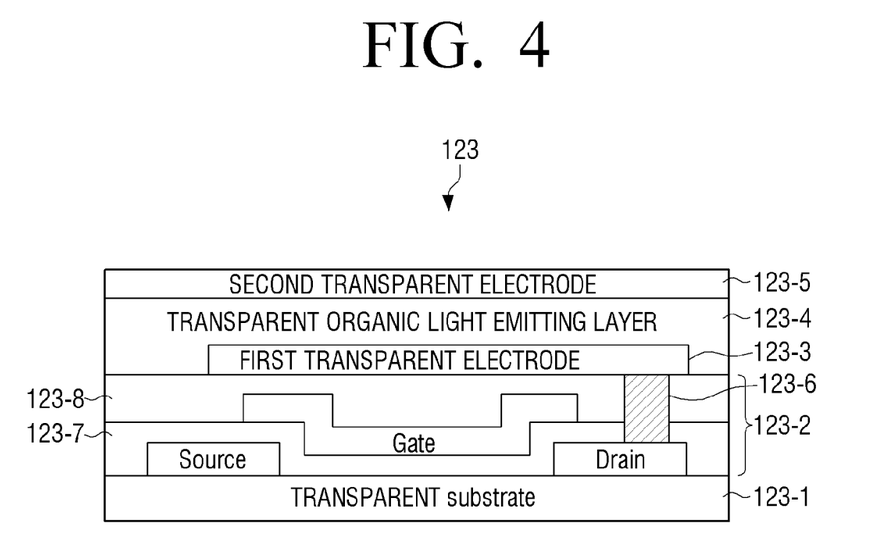
FIG. 4 illustrates a constitution of a transparent display according to an exemplary embodiment.

FIG. 4 illustrates constitution of the transparent display according to an exemplary embodiment.

FIG. 4 is a diagram illustrating an example of detailed constitution regarding the transparent display which is implemented to be a transparent OLED type. Referring to FIG. 4, the transparent display 123 includes a transparent substrate 123-1, transparent transistor layer 123-2, a first transparent electrode 123-3, transparent organic light emitting layer 123-4, a second transparent electrode 123-5, and a connecting electrode 123-6.

The transparent substrate 123-1 may use polymer materials such as plastics or glasses which have transparent features.

The transparent transistor 123-2 indicates a layer including the transistor produced by substituting nontransparent silicon of the related thin film transistor with transparent materials such as Zinc Oxide or Titanium Oxide. Within the transparent transistor 123-2, source, gate, drain and various dielectric films 123-7, 123-8 may be provided, and the connecting electrode 123-6 to electrically connect the drain with the first transparent electrode 123-3 may be provided. Although FIG. 4 illustrates one transparent transistor constituted with the source, the gate, and the drain within the transparent transistor layer 123-2, it may provide a plurality of transparent transistors which are distributed evenly on an entire area of the display surface. The controller 140 may approve controlling signals to each transistor within the transparent transistor layer 123-2, drive a corresponding transparent transistor, and display information.

The first transparent electrode 123-3 and the second transparent electrode 123-5 are arranged in an opposite direction to each other with respect to the transparent organic light emitting layer 123-4. The first transparent electrode 123-3, the transparent organic light emitting layer 123-4 and the second transparent electrode 123-5 form the transparent organic light emitting diodes. The transparent display will not be further described herein.

Figure 5:
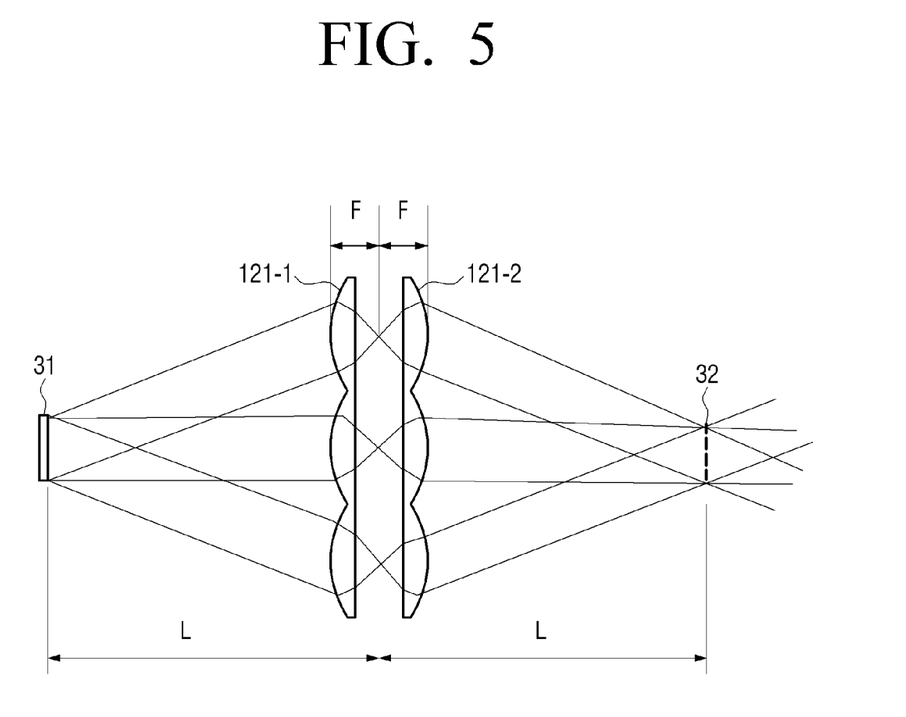
FIG. 5 illustrates a principle of floating images according to an exemplary embodiment.

FIG. 5 illustrates the principle of floating images according to an exemplary embodiment.

As illustrated in FIG. 5, the two lens arrays 121-1, 121-2 sharing a focus may be displaced by preset distance (L) so that the displayed video 32 can be provided as floating images 31 at a displaced space by the uniform distance L in an opposite direction from the two lens arrays.

Figure 6A:
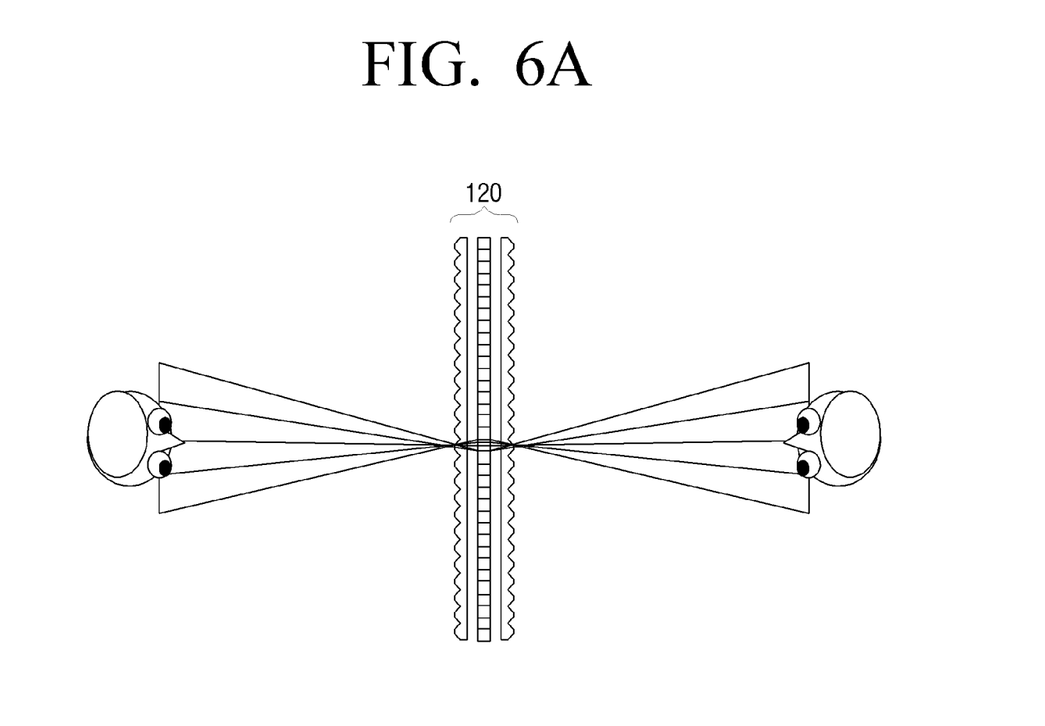
FIGS. 6A and 6B are views provided to explain a method providing bi-directional 3D images according to another exemplary embodiment.
Figure 6B:
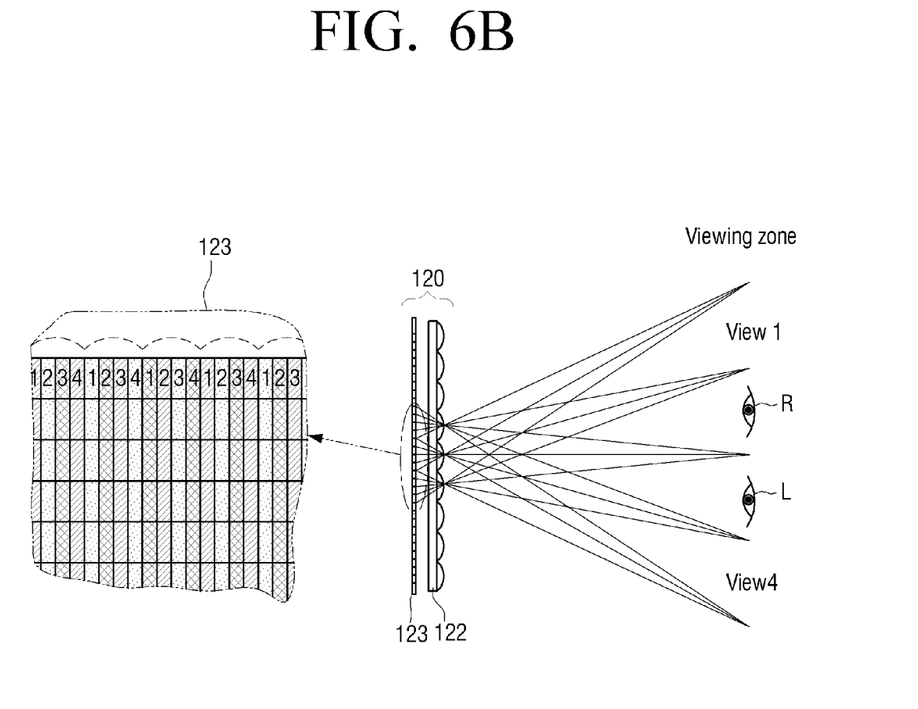

FIGS. 6A and 6B are views provided to explain a method providing bi-directional 3D images according to another exemplary embodiment.

As illustrated in FIG. 6A, when the sub panel 120 includes the transparent display, the sub panel 120 may be used as a bi-directional 3D display. Specifically, each of the two lenticular lens arrays may provide stereoscopic or multi view 3D images on preset viewing distance regarding two viewers standing toward both directions of the sub panel 120. Further, as illustrated in FIG. 5, in response to the transparent display being off, it may provide floating images of objects at shorter distances than the viewing distance.

FIG. 6B is a diagram briefly explaining the method providing 3D images.

As illustrated in FIG. 6B, the lenticular lens 122 including a plurality of lens areas may refract the displayed video on the display panel 123 including a plurality of pixels which are divided into a plurality of columns through a plurality of lens areas. Each lens area may be formed to be a size corresponding to at least one pixel, and may differently disperse lights projecting through each pixel per viewing area. In this case, the divided image lights respectively form viewing areas. Thus, as illustrated in FIG. 6B, when a first to a fourth view are formed, and a left eye and a right eye of a user are respectively placed on the second view and the third view, the user may view 3D images. FIG. 6B explains 3D image viewing method of a user standing in a lens direction. As illustrated in FIG. 6B, a user may view 3D images in both directions through the lenses placed in both directions.

Figure 7:
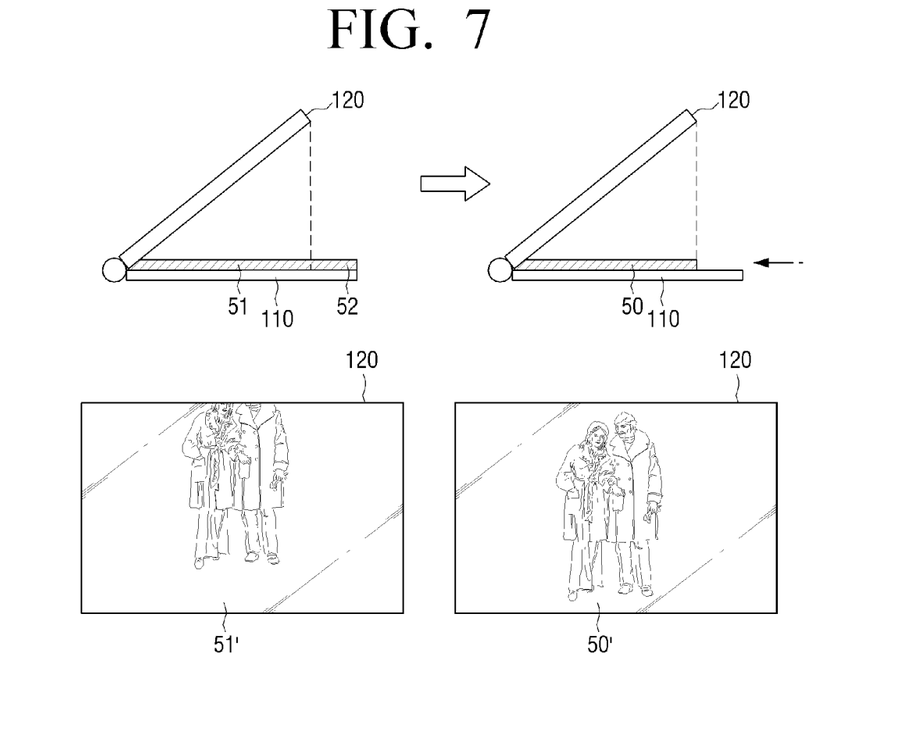
FIG. 7 illustrates a method of adjusting images according to another exemplary embodiment.

FIG. 7 illustrates a method of adjusting images according to another exemplary embodiment.

As illustrated in a left drawing of FIG. 7, when the sub panel 120 forms a preset angle based on the main panel 110, a part of a video 51 may be provided as floating images 51' through the sub panel 120 among the video displayed on the main panel 110 while the other part of the video 52 may not be provided through the sub panel 120.

In this case, a position of the video displayed on the main panel 110 may be adjusted and provided, so that the full video may be the floating images 50'.

Meanwhile, the above embodiments are described without considering position and direction of a user's eyesight; an area to be viewed from a user may be different according to position and direction of a user's eyesight.

Figure 8A:
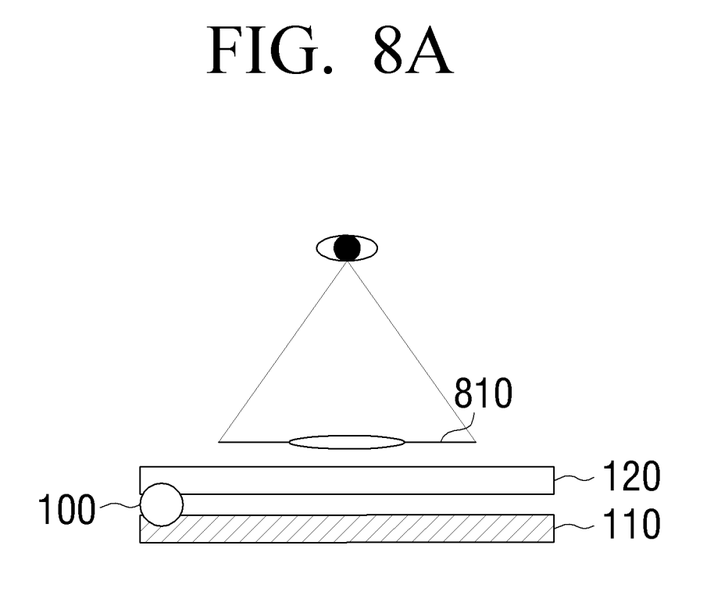
FIGS. 8A and 8B are views provided to explain the method of adjusting images according to another exemplary embodiment.
Figure 8B:
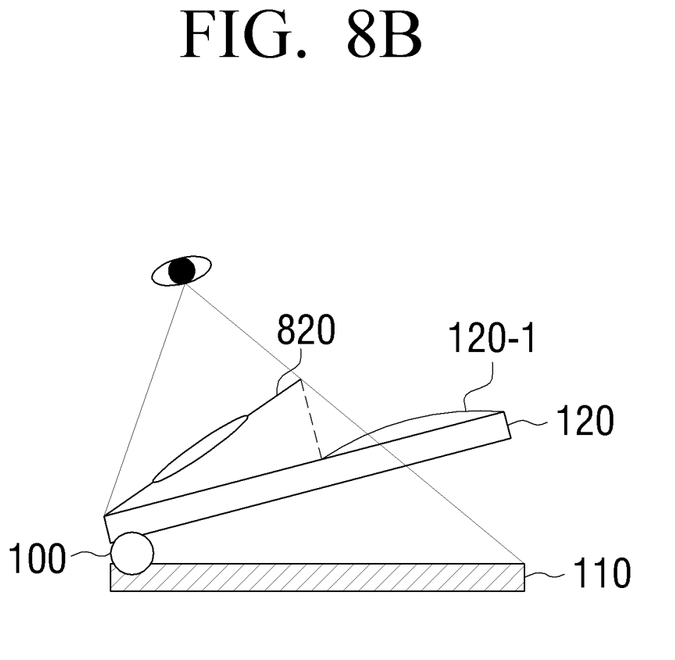

FIGS. 8A and 8B are views provided to explain the method adjusting images according to another exemplary embodiment.

FIG. 8A is a diagram illustrating that the display apparatus 100 is completely folded, i.e., the main panel 110 and the sub panel 120 form 0°. In this case, the video displayed on the main panel 110 may be floated and provided on an entire area of the sub panel 120.

However, as illustrated in FIG. 8B, when the main panel 110 and the sub panel 120 form a preset angle, the video displayed on the main panel 110 may be floated and provided on partial area in the lower end of the sub panel 120. In this case, the other area 120-1 of the sub panel 120 may provide other information. For example, additional information regarding the floated and provided images may be provided.

As described above, according to the various exemplary embodiments, various image effects may be provided through the two sided lens panels and the transparent display.

Meanwhile, the methods according to the various embodiments may be programmed and stored in various storing medium. Thereby, various types of electronic apparatuses implementing the storing medium may implement the above methods according to various exemplary embodiments.

Specifically, according to an exemplary embodiment, it may provide a non-transitory computer readable recording medium storing programs performing the sensing angles formed by the main panel and the sub panel, and the adjusting video on the main panel based on the sensed angles.

A non-transitory computer readable recording medium indicates a medium which stores data semi-permanently and can be read by devices, not a medium storing data temporarily such as register, cache, or memory. Specifically, the above various applications or programs may be stored and provided in non-transitory computer readable recording medium such as compact disk (CD), digital versatile disk (DVD), hard disk, Blu-ray disk, universal serial bus (USB), memory card, or read-only memory (ROM).

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A display apparatus, comprising:
a main panel configured to display an image;
a sub panel configured to provide the image by projecting the image displayed on the main panel, by including a first lens array and a second lens array facing the first lens array so as to share a focus with the first lens array;
a hinge configured to connect the sub panel with the main panel in a manner in which the sub panel is displaceable from the main panel;
a sensor configured to sense angles formed by the main panel and the sub panel; and
a controller configured to control the main panel to adjust a display position of the displayed image based on the sensed angles.

2. The display apparatus of claim 1, wherein the sub panel provides floating images related to the image displayed on the main panel which is displaced from the sub panel by a preset distance, at a side of the sub panel opposite to the main panel.

3. The display apparatus of claim 1, wherein the controller estimates an area to be projected and viewed through the sub panel among the image displayed on the main panel based on the sensed angles, and wherein the main panel adjusts a display position of the displayed image based on the estimated area and displays a result.

4. The display apparatus of claim 1, wherein the sub panel further comprises a transparent medium arranged between the first lens array and the second lens array.

5. The display apparatus of claim 1, wherein the sensor comprises one of an IR transmitter and an IR receiver arranged on one of the main panel and the sub panel, and
the controller controls so that distance between the main panel and the sub panel is sensed based on an operation of the IR transmitter and the IR receiver, and the image on the main panel is adjusted based on the sensed distance and displayed.

6. The display apparatus of claim 1, wherein the sub panel further comprises a transparent display configured between the first lens array and the second lens array to provide a 3D image, and
the controller controls the transparent display to be on or off according to modes.

7. The display apparatus of claim 6, wherein the controller displays the 3D image on the transparent display in response to the transparent display being on.

8. The display apparatus of claim 7, wherein the controller estimates an area where the 3D image is viewed to be floating on the transparent display based on the sensed angles, adjusts a display position of the 3D image based on the estimated area and displays the 3D image.

9. The display apparatus of claim 7, wherein the controller estimates an area where the image displayed on the main panel is projected and viewed on the transparent display based on the sensed angles, and adjusts at least one from among brightness values and color values related to a pixel area corresponding to a displayed object on the projected area, among the 3D image.

10. A control method of a display apparatus, comprising:
displaying an image on a main panel;
sensing angles formed between the main panel and a sub panel which is configured to provide the image by projecting the image being displayed on the main panel, by including, at the sub panel, a first lens array and a second lens array facing the first lens array so as to share a focus with the first lens array; and
adjusting a display position of the image based on the sensed angles.

11. The control method of claim 10, wherein the sub panel provides the image displayed on the main panel, the main panel being displaced by a preset distance from the sub panel, to be floated at a side of the sub panel opposite to the main panel.

12. The control method of claim 10, wherein the adjusting the image on the main panel comprises estimating an area projected and viewed through the sub panel among the image displayed on the main panel based on the sensed angles, adjusting a display position of the image on the main panel based on the estimated area.

13. The control method of claim 10, wherein the sub panel further comprises a transparent medium arranged between the first lens array and the second lens array.

14. The control method of claim 10, wherein the sub panel further comprises a transparent display configured between the first lens array and the second lens array and configured to display 3D image, and the control method further comprising:
controlling the transparent display to be on or off according to modes.

15. The control method of claim 14, further comprising:
displaying 3D image on the transparent display in response to the transparent display being on.

16. The control method of claim 15, further comprising:
estimating an area where the 3D image is floated on the transparent display based on the sensed angles, adjusting a display position of the 3D image based on the estimated area and displaying the 3D image.

17. The control method of claim 15, further comprising:
estimating an area where the image displayed on the main panel is projected and viewed on the transparent display based on the sensed angles, and adjusting at least one from among brightness values and color values related to a pixel area corresponding to a displayed object on the projected area, among the 3D image.

18. A display apparatus, comprising:
a main panel configured to display an image;
a sub panel configured to provide the image by projecting the image being displayed on the main panel;
a sensor configured to sense angles formed by the main panel and the sub panel; and
a controller configured to control the main panel to adjust a display position of the displayed image based on the sensed angles,
wherein the sub panel is displaceable from the main panel.

* * * * *